United States Patent [19]
Read

[11] Patent Number: 5,272,468
[45] Date of Patent: Dec. 21, 1993

[54] IMAGE PROCESSING FOR COMPUTER COLOR CONVERSION

[75] Inventor: Christopher J. Read, Houston, Tex.

[73] Assignee: Texas Instruments Incorporated, Dallas, Tex.

[21] Appl. No.: 693,506

[22] Filed: Apr. 30, 1991

[51] Int. Cl.$^5$ .............................................. G09G 1/28
[52] U.S. Cl. .................................................. 345/153
[58] Field of Search ............... 340/703, 701, 80, 724; 358/12, 13 C, 75

[56] References Cited

U.S. PATENT DOCUMENTS

| | | | |
|---|---|---|---|
| 4,719,503 | 1/1988 | Craver et al. | 358/12 |
| 4,737,772 | 4/1988 | Nishi et al. | 340/703 |
| 4,751,660 | 6/1988 | Hedley | 340/724 |
| 4,791,580 | 12/1988 | Sherrill et al. | 340/703 |
| 4,829,455 | 5/1989 | Long et al. | 340/703 |
| 4,875,090 | 10/1989 | Shimokoriyama et al. | 358/12 |
| 5,065,144 | 11/1991 | Edelson et al. | 340/703 |
| 5,065,234 | 11/1991 | Hung et al. | 358/80 |
| 5,081,529 | 1/1992 | Collette | 358/80 |

*Primary Examiner*—Ulysses Weldon
*Assistant Examiner*—Gin Goon
*Attorney, Agent, or Firm*—Robert D. Marshall, Jr.; James C. Kesterson; Richard L. Donaldson

[57] ABSTRACT

A colorspace converter for use with image processing systems. The colorspace converter transforms digitized image data in one colorspace into image data in another colorspace, for use by a computer monitor. The colorspace converter uses look-up tables and other logic devices, and avoids the need for processor intervention. The look-up tables may be loaded for simple mapping, and extension look-up tables may be loaded for nonlinear extension transformations.

12 Claims, 2 Drawing Sheets

IMAGE PROCESSING FOR COMPUTER COLOR CONVERSION

TECHNICAL FIELD OF THE INVENTION

This invention relates to image processing, and more particularly to converting a digital image or picture represented in one colorspace to a video signal represented in another colorspace for display on a computer monitor.

BACKGROUND OF THE INVENTION

Many image processing applications, such as image capture from a video signal, involve the conversion of a source image signal to a different signal for display on a computer monitor. For example, in some applications, incoming data is captured from a multi-dimensional colorspace signal, such as a YIQ signal or a Y, R-Y, B-Y signal, both of which are standard television transmission signals. The data is processed in that format. Before display, the data must be converted to a red, green, blue (RGB) format because the computer monitor, typically a cathode ray tube (CRT), expects the computer or other display driver to provide separate RGB signals.

The mathematical transformation required for this type of conversion from one colorspace to another requires a substantial amount of processing power. For YIQ to RGB conversion, 9 multiplies and 6 adds are required per pixel. Thus, $640 \times 480 \times 30 \times 9$ multiplies and 55 million adds per second are required to convert a YIQ television signal following the NTSC standard to an RGB signal for a typical monitor. For Y, R-Y, B-Y to RGB conversion, 3 multiplies and 4 adds are required per pixel.

The matrix calculations for such mathematical transformations are known in the art of image processing. An example of the mathematics for a YIQ to RGB conversion is set out in Hall, *Illumination and Color in Computer Generated Imaging*, p. 133, Springer-Verlag (1989).

One approach to image data conversion is the use of palettes, which are essentially look-up tables. In applications that do not involve colorspace to colorspace conversions, palettes are used to convert one-dimensional computer generated image data to other one dimensional data, i.e., greyscale data, or to convert one dimensional data to three dimensional data, i.e., RGB data.

However, for color conversion for photographic type pictures, conversion from a three dimensional color space to a different three dimensional space is required.

A need exists for a method of colorspace conversion that does not unduly burden the overall processing capacity of the computer system.

SUMMARY OF THE INVENTION

One aspect of the invention is a colorspace converter for transforming data representing one colorspace into data representing another colorspace. An array of transformation look-up tables receives digitized image data, such as YIQ data, representing an input colorspace. The dimensions of this array are the same as the number of components of the input colorspace and the number of components of the output colorspace. Thus, for YIQ to RGB conversion, the array has nine look-up tables. Each address of each look-up table represents a value of input data, and the look-up tables are loaded with a transformation value at each address. A number of adder units add the output of look-up tables producing like color data of the output colorspace. The result is a sum of values for each color in the output colorspace. Each sum is delivered to a saturation unit, which limits each sum to a saturation value.

A technical advantage of the invention is that conversion from one colorspace to another is performed in a palette instead of by a host or a graphics processor. This is particularly important when displaying moving pictures, which requires a colorspace conversion for each screen refresh. At a 72 Hz refresh rate and using a $640 \times 480$ pixel display, there are far more multiplies and adds per second than most existing image processing systems can handle.

DETAILED DESCRIPTION OF THE INVENTION

Figure 1:
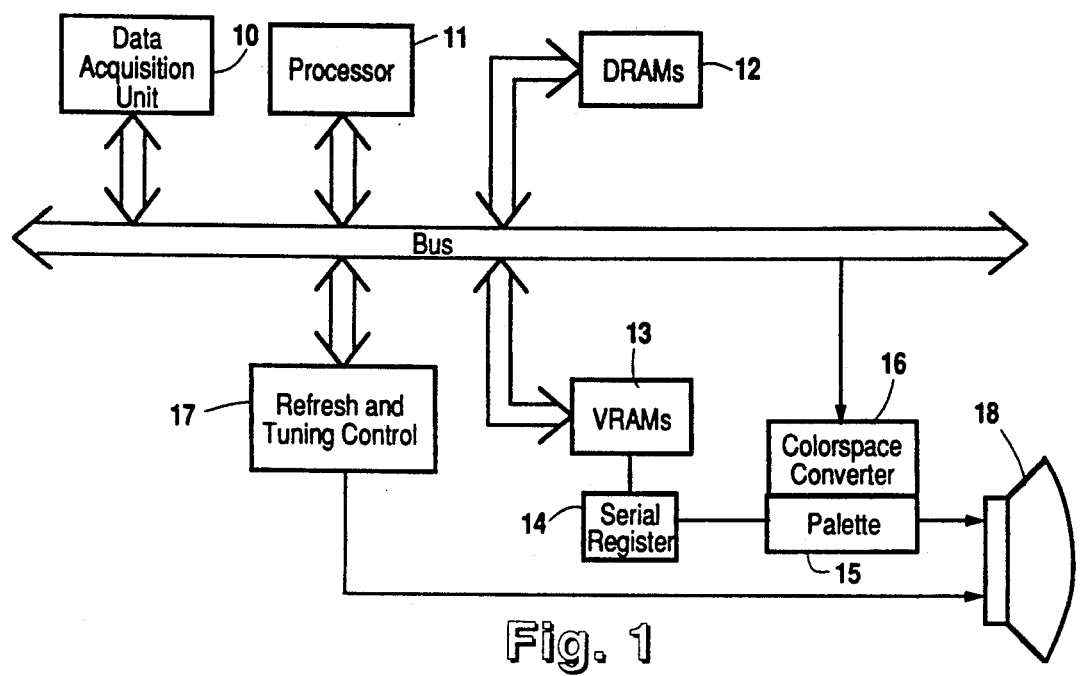
FIG. 1 illustrates an image processing system having a palette that includes a colorspace converter.

FIG. 1 illustrates a color conversion system, used for image capture and processing applications. It provides real-time conversion from one colorspace to another colorspace during a CRT display process.

A data acquisition unit 10 is used to capture and digitize a video signal, or to otherwise provide digital image data, which is to be processed by processor 11. For purposes of this description, "image data" includes video, photographic, or any other type of data representing graphic information, whether moving or not. However, because of its real-time capability, the colorspace converter described herein is especially useful for moving pictures, such as from a television camera.

Dynamic random access memory 12 is used in a conventional manner for program and data storage. Refresh and timing control unit 17 provides control for refreshing the computer monitor 18, and for other conventional timing functions.

Video random access memory 13 acts a frame buffer. The output of video random access memory 13 goes to a serial register 14, and then to a palette 15.

The function of palette 15 is two-fold. First, it converts digital data in one colorspace to data in another colorspace, using colorspace converter 16 in accordance with the description herein. Second, it converts digital data to analog signals for use by monitor 18. For purposes of example, the conversion described herein is a YIQ to RGB conversion, but the same techniques could be applied to other colorspace conversions.

The converted data is delivered to a computer monitor 18. Although not shown in FIG. 1, timing signals are also provided, using known techniques.

Figure 2:
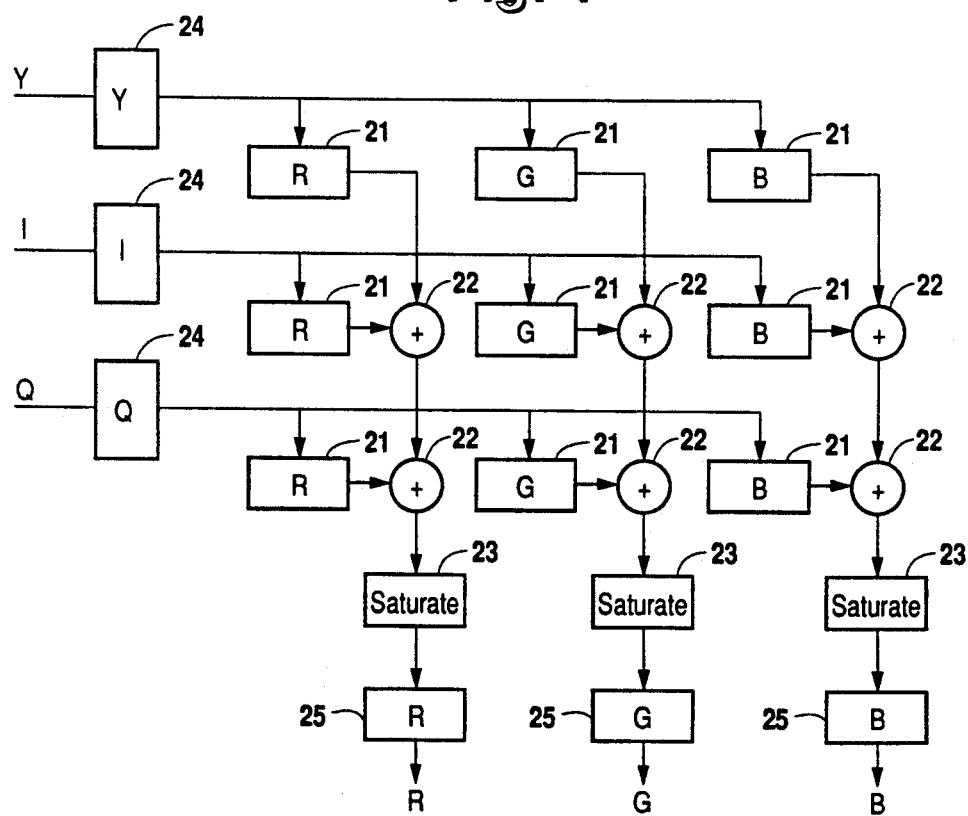
FIG. 2 is a block diagram of an example of using the colorspace converter for YIQ to RGB conversion.

FIG. 2 illustrates the operation of colorspace converter 16. The general scheme of the colorspace converter 16 is the use of look-up tables (LUT's) 21 to perform three dimensional colorspace transformations.

Colorspace converter 16 has multiple inputs, with N LUT's 21 for each input, where N is the number of outputs. Each input is typically 8 bits. In the YIQ to RGB conversion described herein, three inputs correspond to the YIQ components, and each input is associated with three LUT's 21 which represent three RGB output signals. In this case, the LUT's 21 perform the function of multipliers.

LUT's 21 are implement with random access memory (RAM) devices. For 8 bits in and 8 bits out, each LUT 21 is a 256×8 memory. For fixed conversion computations, fixed logic devices, such as a read only memory, may be used. Referring again to FIG. 1, colorspace converter 16 is are in communication with processor 11, so that each LUT 21 may be loaded with values that will permit the YIQ input to be mapped to a desired RGB output.

Adders 22 add the output of each LUT 21 to like output of other LUT's 21. Thus, the R components from the R LUT's 21 are added together, as are the G and B components of G and B LUT's 21. Adders 22 are standard logic devices.

Saturate units 23 ensure that the results of the addition of each color component are add with saturate, to avoid the results of arithmetic overflow. Thus, for example, if the results of adding the 3 R components results in a value that exceeds a saturation value, the R saturation unit 23 reduces the sum to the saturation value. Saturation units 23 are also implemented with logic devices. In the case of positive and negative output values of LUT's 21, saturation units 23 saturate both maximum and minimum values.

In operation, colorspace converter 16 receives data representing a pixel during a given time period. Each component of the input colorspace data is transformed into an output colorspace value, using look-up tables 21. The data representing like components of the output colorspace are added together, using adder units 22. Each sum is tested for saturation by a saturation unit 23, and any sums that exceed a predetermined saturation value are limited to that value. Thus, for each pixel, the arithmetic computations are limited to six adds, with all other operations being simple compare and memory access operations.

A feature of the invention is that it permits negative as well as positive values to be transformed. In the case of negative values, saturation units 23 are modified to support appropriate computations, such as two's complement addition.

Input extension LUT's 24 may be used to compensate for nonlinearities associated with the input. Likewise, output extension LUT's may be used to compensate for nonlinearities associated with the output device or with the human vision system. These LUT's 24 and 25 may be loaded with any desired transfer function.

Figure 3:
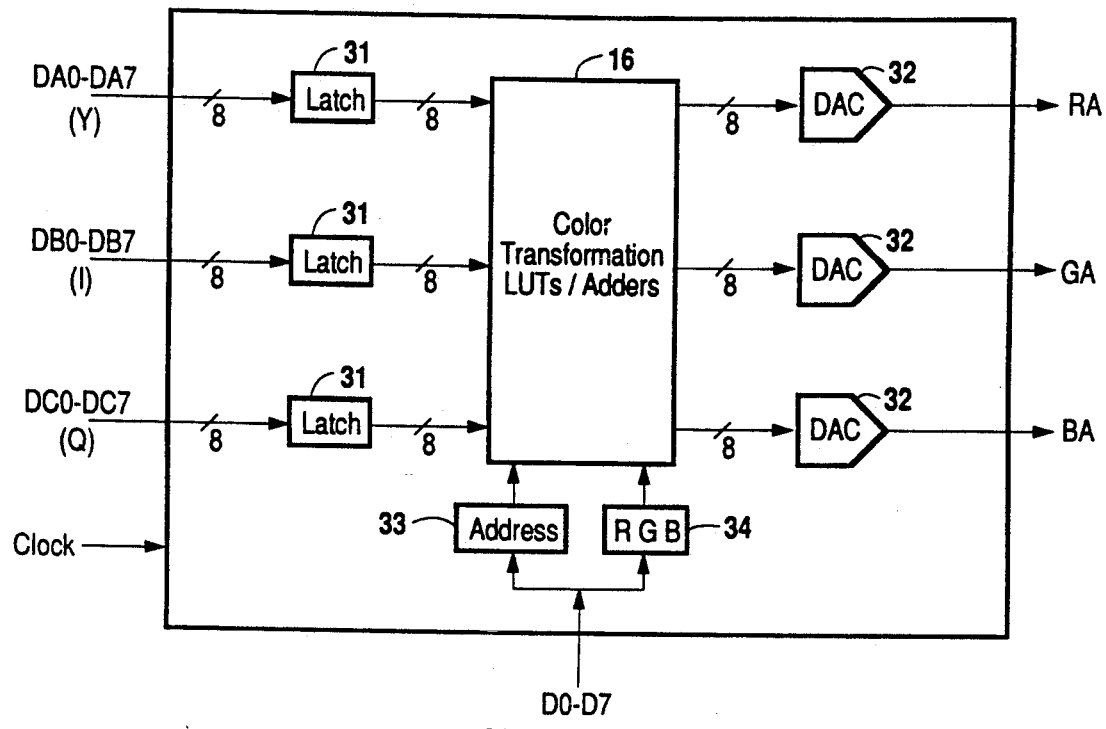
FIG. 3 illustrates an implementation of the invention in an integrated circuit.

FIG. 3 illustrates how colorspace converter 16 may be implemented in an integrated circuit. For conversion from one three dimensional colorspace to another, three input ports, represented by DA0-DA7, DB0-DB7, and DC0-DC7, each receive a component of image data, such as YIQ data. Each input data line is associated with a row of look-up tables, such that colorspace converter 16 has the configuration of FIG. 2, and is loaded with transform values, using address and data input registers 33 and 34, or other interface means with processor 11.

The input data to be transformed is latched into input latches 31. The output of these latches 31 is fed into colorspace converter 16, which transforms the data. The transformed data is delivered to digital to analog converters 32, whose output is sent to monitor 18.

An advantage of the invention is that it permits subsampling of the chroma component of an input colorspace within colorspace converter 16. For example, a different data rate may be used for the Y component than for the I and Q components of a YIQ signal, using a latch in the I and Q data paths prior to delivery of the data to LUT's 21. This latch is clocked at some ratio of the clocking frequency of the Y component.

Figure 4:
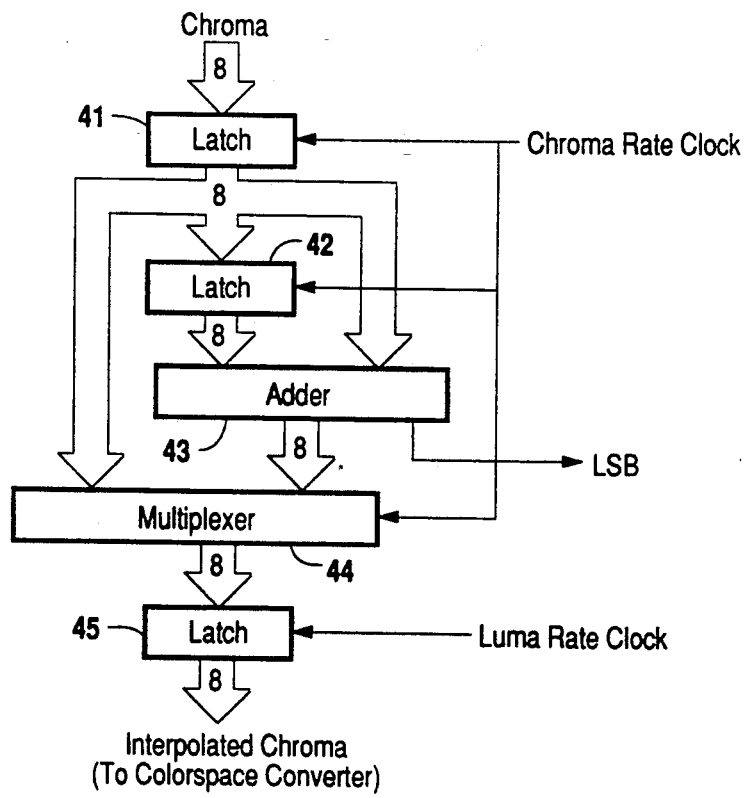
FIG. 4 illustrates a circuit that is used with the colorspace converter to interleave subsampled and interpolated color components of YIQ data.

FIG. 4 illustrates a circuit that interpolates I or Q values. A first latch 41 receives chroma, i.e., I or Q data. The chroma data is clocked at a chroma clock rate, and delivers the data to a second latch 42, an adder 43, and a multiplexer 44. Latch 42 and adder 43 are used to interpolate spatially proximate data, and multiplexer 44 is used to interleave subsampled and interpolated data. Latch 42 is also clocked at the chroma clock rate. Adder 43 prevents overflow by discarding the least significant bit. The output of multiplexer 45 is delivered to a third latch 45, which is clocked at a luma, i.e., Y, clock rate, such that the output of the subsampling circuit is at the luma rate. For this implementation, the chroma clock rate of latches 41 and 42 is one-half the luma clock rate, thus the input I and Q components are subsampled at 2:1, as compared to the sampling of the Y component.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A colorspace converter for transforming image data in a first colorspace consisting of a set of N first color components into image data in a second colorspace consisting of a set of M second color components, said first colorspace including a luma first color component having a first data rate and at least one chroma first color component having a second data rate half said first data rate, comprising:

a plurality of chroma interpolators, each receiving a corresponding one of said at least one chroma first color component, each of said chroma interpolators including a first latch receiving, temporarily storing and outputting said corresponding chroma first color component at said second data rate, a second latch connected to said first latch for receiving, temporarily storing and outputting said output of said first latch at said second data rate, an adder circuit connected to said first and second latches for generating the sum of said outputs of said first and second latches, discarding the least significant bit of said sum, thereby producing an interpolated chroma first component, a multiplexer connected to said first latch and said adder circuit for alternately outputting said output of said first latch and said sum of said adder circuit, and a third latch connected to said multiplexer for receiving, temporarily storing and outputting said output of said multiplexer at said first data rate, thereby generating an interpolated chroma color component;

an array of transformation look-up tables consisting of N rows of M columns, each first color components including said interpolated chroma color component from said third latch coupled to said transformation look-up tables of a corresponding row, each transformation look-up table employing an input first color component as an address for recall of a transformation value at said address;

(N−1)M adder units, each adder unit corresponding to a transformation look-up table of each row of said array except for a first row of said array, said adder units corresponding to a second row of said array producing a sum of the transformation value of a transformation look-up table of said first row of the array and the transformation value of transformation look-up table of said second row of the array of a corresponding column of the array, each adder unit corresponding to subsequent rows of said array producing a sum of the transformation value of a corresponding transformation look-up table and the sum of an adder of an immediately prior row of a corresponding column of the array;

M saturation units, each saturation unit receiving the sum of an adder unit of a corresponding column of a last row of the array and producing an output value limited to a corresponding saturation values; and M output extension look-up tables, each output extension look-up table employing said output value of a corresponding saturation unit as an address for recall of a corrected output value at said address, said corrected output value being a corresponding second color component.

2. The colorspace converter of claim 1, wherein:
said output extension look-up tables have output values corresponding to addresses for compensating for nonlinearities associated with an output device.

3. The colorspace converter of claim 1, further comprising:
N input extension look-up tables, each input extension look-up table employing a corresponding first color component as an address for recall of a corrected first color component at said address, said corrected first color component forming the input to said transformation look-up tables of said corresponding row of said array.

4. The colorspace converter of claim 3, wherein:
said input extension look-up tables have output values corresponding to addresses for compensating for nonlinearities associated with an input device.

5. The colorspace converter of claim 1, further comprising:
N input latches, each receiving and temporarily storing a corresponding first color component and supplying said stored first color component to said transformation look-up tables of a corresponding row of said array.

6. A colorspace converter for transforming image data in a first colorspace consisting of a set of N first color components into image data in a second colorspace consisting of a set of M second color components, said first colorspace including a luma first color component having a first data rate and at least one chroma first color component having a second data rate half said first data rate, comprising:

a plurality of chroma interpolators, each receiving a corresponding one of said at least one chroma first color component, each of said chroma interpolators including
a first latch receiving, temporarily storing and outputting said corresponding chroma first color component at said second data rate,
a second latch connected to said first latch for receiving, temporarily storing and outputting said output of said first latch at said second data rate,
an adder circuit connected to said first and second latches for generating the sum of said outputs of said first and second latches, discarding the least significant bit of said sum, thereby producing an interpolated chroma first component,
a multiplexer connected to said first latch and said adder circuit for alternately outputting said output of said first latch and said sum of said adder circuit, and
a third latch connected to said multiplexer for receiving, temporarily storing and outputting said output of said multiplexer at said first data rate, thereby generating an interpolated chroma color component;

N input extension look-up tables, each input extension look-up table employing a corresponding first color component as an address for recall of a corrected first color component at said address, at least one of said N input extension look-up tables employing said interpolated chroma color component from said third latch;

an array of transformation look-up tables consisting of N rows of M columns, each input extension look-up table coupled to said transformation look-up tables of a corresponding row, each transformation look-up table employing a corresponding corrected first color component as an address for recall of a transformation value at said address;

(N−1)M adder units, each adder unit corresponding to a transformation look-up table of each row of said array except for a first row of said array, said adder units corresponding to a second row of said array producing a sum of the transformation value of a transformation look-up table of said first row of the array and the transformation value of transformation look-up table of said second row of the array of a corresponding column of the array, each adder unit corresponding to subsequent rows of said array producing a sum of the transformation value of a corresponding transformation look-up table and the sum of an adder of an immediately prior row of a corresponding column of the array; and M saturation units, each saturation unit receiving the sum of an adder unit of a corresponding column of a last row of the array and producing an output value limited to a corresponding saturation values, said output value being a corresponding second color component.

7. The colorspace converter of claim 6, wherein:
said input extension look-up tables have output values corresponding to addresses for compensating for nonlinearities associated with an input device.

8. The colorspace converter of claim 6, further comprising:
N input latches, each receiving and temporarily storing a corresponding first color component and supplying said stored first color component to said transformation look-up tables of a corresponding row of said array.

9. The colorspace converter of claim 6, further comprising:

N input latches, each receiving and temporarily storing a corresponding first color component from said data acquisition unit and supplying said stored first color component to said transformation look-up tables of a corresponding row of said array.

10. An image processing system comprising:

a data acquisition unit for acquiring image data in a first colorspace consisting of a N first color components;

a colorspace converter for transforming said image data in said first colorspace into image data in a second colorspace consisting of a set of M second color components, said first colorspace including a luma first color component having a first data rate and at least one chroma first color component having a second data rate half said first data rate, said colorspace converter including a plurality of chroma interpolators, each receiving a corresponding one of said at least one chroma first color component, each of said chroma interpolators including a first latch receiving, temporarily storing and outputting said corresponding chroma first color component at said second data rate, a second latch connected to said first latch for receiving, temporarily storing and outputting said output of said first latch at said second data rate, an adder circuit connected to said first and second latches for generating the sum of said outputs of said first and second latches, discarding the least significant bit of said sum, thereby producing an interpolated chroma first component, a multiplexer connected to said first latch and said adder circuit for alternately outputting said output of said first latch and said sum of said adder circuit, and a third latch connected to said multiplexer for receiving, temporarily storing and outputting said output of said multiplexer at said first data rate, thereby generating an interpolated chroma color component;

N input extension look-up tables, each input extension look-up table employing a corresponding first color component as an address for recall of a corrected first color component at said address, at least one of said N input extension look-up tables employing said interpolated chroma color component from said third latch;

an array of transformation look-up tables consisting of N rows of M columns, each input extension look-up table coupled to said transformation look-up tables of a corresponding row, each transformation look-up table employing a corresponding corrected first color component as an address for recall of a transformation value at said address;

(N−1)M adder units, each adder unit corresponding to a transformation look-up table of each row of said array except for a first row of said array, said adder units corresponding to a second row of said array producing a sum of the transformation value of a transformation look-up table of said first row of the array and the transformation value of transformation look-up table of said second row of the array of a corresponding column of the array, each adder unit corresponding to subsequent rows of said array producing a sum of the transformation value of a corresponding transformation look-up table and the sum of an adder of an immediately prior row of a corresponding column of the array;

M saturation units, each saturation unit receiving the sum of an adder unit of a corresponding column of a last row of the array and producing an output value limited to a corresponding saturation values; and M output extension look-up tables, each output extension look-up table employing said output value of a corresponding saturation unit as an address for recall of a corrected output value at said address, said corrected output value being a corresponding second color component;

M digital to analog converters, each digital to analog converter connected to a corresponding output extension look-up table of said colorspace converter for converting the corresponding second color component into an analog display signal; and a display unit connected to said digital to analog converters for generating a visible display corresponding to said analog display signals.

11. The image processing system of claim 10, wherein: said colorspace converter wherein said output extension look-up tables have output values corresponding to addresses for compensating for nonlinearities associated with said display unit.

12. The image processing system of claim 10, wherein: said colorspace converter wherein said input extension look-up tables have output values corresponding to addresses for compensating for nonlinearities associated with said data acquisition unit.

* * * * *